(12) United States Patent
Hosokawa

(10) Patent No.: US 10,725,635 B2
(45) Date of Patent: Jul. 28, 2020

(54) INFORMATION PROCESSING APPARATUS, INFORMATION PROCESSING METHOD AND STORAGE MEDIUM

(71) Applicant: Sharp Kabushiki Kaisha, Osaka (JP)

(72) Inventor: Teppei Hosokawa, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 355 days.

(21) Appl. No.: 15/198,146

(22) Filed: Jun. 30, 2016

(65) Prior Publication Data

US 2017/0031568 A1 Feb. 2, 2017

(30) Foreign Application Priority Data

Jul. 30, 2015 (JP) ................................ 2015-150650

(51) Int. Cl.
| | | |
|---|---|---|
| G06F 3/048 | (2013.01) | |
| G06F 3/0484 | (2013.01) | |
| G06F 3/0488 | (2013.01) | |
| H04N 5/45 | (2011.01) | |
| H04N 21/422 | (2011.01) | |
| H04N 5/44 | (2011.01) | |

(52) U.S. Cl.
CPC ...... G06F 3/04845 (2013.01); G06F 3/04883 (2013.01); G06F 3/04886 (2013.01); H04N 5/45 (2013.01); H04N 21/422 (2013.01); H04N 5/4403 (2013.01); H04N 2005/443 (2013.01)

(58) Field of Classification Search
CPC ............. G06F 3/04845; G06F 3/04883; G06F 3/04886; H04N 5/45; H04N 21/422; H04N 5/4403; H04N 2005/443
See application file for complete search history.

(56) References Cited

U.S. PATENT DOCUMENTS

| | | | |
|---|---|---|---|
| 5,610,664 A | 3/1997 | Bobert | |
| 8,171,423 B2* | 5/2012 | Olsen | .................... G06F 3/1423 |
| | | | 709/226 |
| 2002/0196284 A1* | 12/2002 | Berquist | ............... G06F 3/0481 |
| | | | 715/769 |
| 2009/0091547 A1 | 4/2009 | Kikuoka | |

(Continued)

FOREIGN PATENT DOCUMENTS

| | | |
|---|---|---|
| JP | 07-193795 A | 7/1995 |
| JP | 08-328531 A | 12/1996 |

(Continued)

*Primary Examiner* — Anil N Kumar
(74) *Attorney, Agent, or Firm* — ScienBiziP, P.C.

(57) ABSTRACT

An information processing system comprises a first computer, a second computer, a display apparatus and a touch panel. The display apparatus includes a display portion, and displays a first screen that is transmitted from the first computer and a second screen that is transmitted from the second computer on the display portion. The touch panel includes a touch controller, and is provided on a display surface of the display portion of the display apparatus. Furthermore, the touch controller includes a CPU. Then, under instructions of the CPU, when a touch input designates the second screen, a display position of the second screen is moved according to a change of touch coordinates of the touch input.

3 Claims, 12 Drawing Sheets

(56) References Cited

U.S. PATENT DOCUMENTS

| | | | |
|---|---|---|---|
| 2011/0296329 A1* | 12/2011 | Tanaka | G06F 1/1647 715/769 |
| 2013/0227472 A1* | 8/2013 | Sosinski | G06F 3/0481 715/794 |
| 2013/0237288 A1* | 9/2013 | Lee | G06F 3/041 455/566 |
| 2015/0042578 A1 | 2/2015 | Nagai | |
| 2015/0205775 A1* | 7/2015 | Berdahl | G06F 3/04842 715/255 |
| 2015/0294649 A1 | 10/2015 | Imamura | |

FOREIGN PATENT DOCUMENTS

| | | |
|---|---|---|
| JP | 2005-260289 A | 9/2005 |
| JP | 2009-087295 A | 4/2009 |
| JP | 2014-085897 A | 5/2014 |
| JP | 2015-035045 A | 2/2015 |

\* cited by examiner

INFORMATION PROCESSING APPARATUS, INFORMATION PROCESSING METHOD AND STORAGE MEDIUM

CROSS REFERENCE OF RELATED APPLICATION

The disclosure of Japanese patent application No. 2015-150650 filed on Jul. 30, 2015 is incorporated by reference.

BACKGROUND OF THE INVENTION

Field of the Invention

The present invention relates to information processing apparatus, information processing method and a storage medium, and more specifically, an information processing apparatus comprising a display portion and a touch panel that is provided on a display screen of the display portion, and an information processing method and a storage medium.

Description of the Related Art

An example of a related art is disclosed in Japanese patent application laying-open No. H07-193795 [H04N 7/025] laid-open on Jul. 28, 1995 (Literature 1). In an information processing apparatus disclosed in this Literature 1, it is possible to display a slave screen while being overlapped with a master screen as a picture-in-picture (PIP), and to move a display position of the PIP by an operation of a remote controller.

However, in the above-described related art, when moving the display position of the PIP, it is troublesome without moving it only by an operation of the remote controller.

SUMMARY OF THE INVENTION

Therefore, it is a primary object of the present invention to provide a novel information processing apparatus, information processing method and storage medium.

Furthermore, it is another object of the present invention to provide an information processing apparatus, information processing method and storage medium, capable of moving a display position of a PIP with a simple operation. A first invention is an information processing apparatus comprising a display portion and a touch panel. The display portion is a so-called display, and configured to display a first screen and a second screen that is displayed in front of the first screen concerned so as to be overlapped with a part of a display range of the first screen concerned on a display surface. That is, the second screen is made to be displayed on the first screen as a PIP. The touch panel that is provided on the display surface of the display portion. This touch panel is a general-purpose touch panel, and one of arbitrary systems such as an electrostatic capacity system, an electromagnetic induction system, a resistance film system, an infrared ray system, etc. can be used for it. This touch panel comprises a detection portion, a first determination portion and a transmission portion. The detection portion is configured to detect coordinates corresponding to a position that is designated by an input operation by a user. The first determination portion is configured to determine, based on the coordinates detected by the detection portion, whether the input operation designates the second screen. The transmission portion is configured to transmit coordinates data corresponding to the coordinates detected by the detection portion to the display portion when it is determined by the first determination portion that the input operation designates the second screen. Furthermore, the display portion comprises a reception portion and a control portion. The reception portion is configured to receive the coordinates data that is transmitted by the transmission portion. The control portion is configured to move a display position of the second screen according to a change of the coordinates corresponding to the coordinates data received by the reception portion.

According to the first invention, since the display position of the second screen is moved according to a change of the coordinates detected by the detection portion when it is determined that the input operation designates the second screen, the display position of the second screen can be moved by a simple operation.

A second invention is the information processing apparatus according to the first invention, and further comprises a first screen generation portion configured to generate first screen data corresponding to the first screen and transmit the first screen data concerned to the display portion, wherein the transmission portion is configured to transmit the coordinates data corresponding to the coordinates detected by the detection portion to the first screen generation portion when it is determined by the first determination portion that the input operation is to an outside of a display range of the second screen.

According to the second invention, since the coordinates data corresponding to the coordinates detected by the detection portion is transmitted to the first screen generation portion when it is determined that the input operation is to the outside of the display range of the second screen, other processing except moving the display position of the second screen can be performed in the first screen generation portion.

A third invention is the information processing apparatus according to the first invention, wherein the display portion further comprises a setting portion configured to set up a movement prohibition range that is a range prohibiting a movement of the second screen, and a second determination portion configured to determine whether the coordinates corresponding to the coordinates data that is received by the reception portion is included within the movement prohibition range, wherein the control portion does not move the second screen when it is determined by the second determination portion that the coordinates corresponding to the coordinates data that is received by the reception portion is included within the movement prohibition range.

According to the third invention, since the second screen is not moved when it is determined by the second determination portion that the coordinates corresponding to the coordinates data that is received by the reception portion is included within the movement prohibition range, the second screen is not erroneously moved to a position wishing not to move it.

A fourth invention is a non-transitory computer-readable storage medium that stores an information processing program executed by one or more computer processors of an information processing apparatus comprising a display portion configured to display a first screen and a second screen that is displayed in front of the first screen concerned so as to be overlapped with a part of a display range of the first screen concerned on a display surface and a touch panel that is provided on the display surface of the display portion. The information processing program makes the one or more computer processors function as: a detection portion configured to detect coordinates corresponding to a position of the touch panel designated by an input operation by a user; a first determination portion configured to determine, based on the coordinates detected by the detection portion, whether the input operation designates the second screen; a transmission portion configured to transmit coordinates data corresponding to the coordinates detected by the detection portion to the display portion when it is determined by the first determination portion that the input operation designates the second screen; a reception portion configured to receive the coordinates data transmitted by the transmission portion; and a control portion configure to move a display position of the second screen according to a change of the coordinates corresponding to the coordinates data received by the reception portion.

A fifth invention is an information processing method performed in an information processing apparatus comprising a display portion configured to display a first screen and a second screen that is displayed in front of the first screen concerned so as to be overlapped with a part of a display range of the first screen concerned on a display surface and a touch panel that is provided on the display surface of the display portion, the information processing apparatus is configured to perform: (a) detecting coordinates corresponding to a position of the touch panel designated by an input operation by a user; (b) determining, based on the coordinates detected in the step (a), whether the input operation designates the second screen; (c) transmitting coordinates data corresponding to the coordinates detected in the step (a) to the display portion when it is determined in the step (b) that the input operation designates the second screen; (d) receiving the coordinates data transmitted in the step (c), and (e) moving a display position of the second screen according to a change of the coordinates corresponding to the coordinates data received in the step (d).

According to the fourth or fifth invention, like the first invention, it is possible to move the display position of the second screen with a simple operation.

The above mentioned objects and other objects, features, aspects and advantages of the present invention will become more apparent from the following detailed description of the present invention when taken in conjunction with the accompanying drawings.

DETAILED DESCRIPTION OF NON-LIMITING EXAMPLE EMBODIMENTS

First Embodiment

Figure 1:
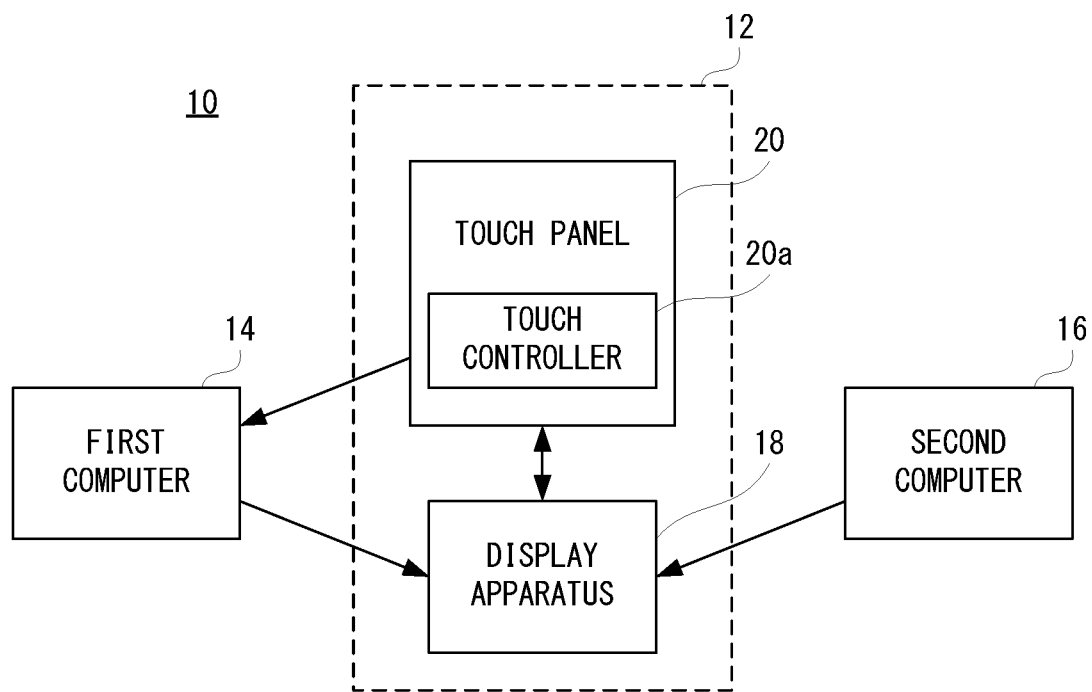
FIG. 1 is a block diagram showing an example of structure of an information processing system according to an embodiment of the present invention.

FIG. 1 is a block diagram showing an example of structure of an information processing system 10 according to the present invention.

With reference to FIG. 1, the information processing system 10 that is the first embodiment of the present invention includes an electronic blackboard 12, a first computer 14 and a second computer 16.

The electronic blackboard 12 is also called an interactive whiteboard (IWB), and is constituted by a display apparatus 18 and a touch panel 20. The display apparatus 18 is a general-purpose display apparatus such as an LCD, an EL (Electro-Luminescence) display, etc. The display apparatus 18 includes a display portion 46 (see FIG. 2), and displays on the display portion 46 screens (images) corresponding to screen data that are respectively output from the first computer 14 and the second computer 16. This first embodiment will be described about a case where the electronic blackboard 12 is constituted by the display apparatus 18 and the touch panel 20; however, as long as a touch input is possible, other display apparatus such as a tablet terminal etc. may be constituted other than the electronic blackboard.

Each of the first computer 14 and the second computer 16 is a general-purpose computer that outputs screen data to the display apparatus 18. This first computer 14 and second computer 16 each comprises components such as a CPU, a RAM, an HDD, a communication module, etc.

The touch panel 20 includes a touch controller 20a, and is provided on a display surface of the display portion 46. The touch panel 20 is a general-purpose touch panel, and one of arbitrary systems such as an electrostatic capacity system, an electromagnetic induction type, a resistance film system, an infrared system, etc. can be used for it.

The touch controller 20a detects a touch input on the touch panel 20 by a user, and outputs data (touch coordinates data) about coordinates of a position designated in this touch input (touch coordinates) to the first computer 14 or the display apparatus 18. It should be noted that the touch input means operations of a touch-on, a touch-off, a slide, a flick, etc. Furthermore, the touch controller 20a outputs the touch coordinates data corresponding to a current touch position of a continuous touch input, that is, an input of a slide or flick with a cycle shorter than a predetermined cycle. The predetermined cycle is one (1) to few or several frames, for example, and one (1) frame is 1/30 seconds, 60 l/seconds or 1/120 seconds.

In this first embodiment, a touch panel of an electrostatic capacity system is used as the touch panel 20. Furthermore, a touch effective range of the touch panel 20 is identical with a whole or approximately whole area of the display portion 46. The user can perform a touch input with an electronic pen, a finger or the like.

Figure 2:
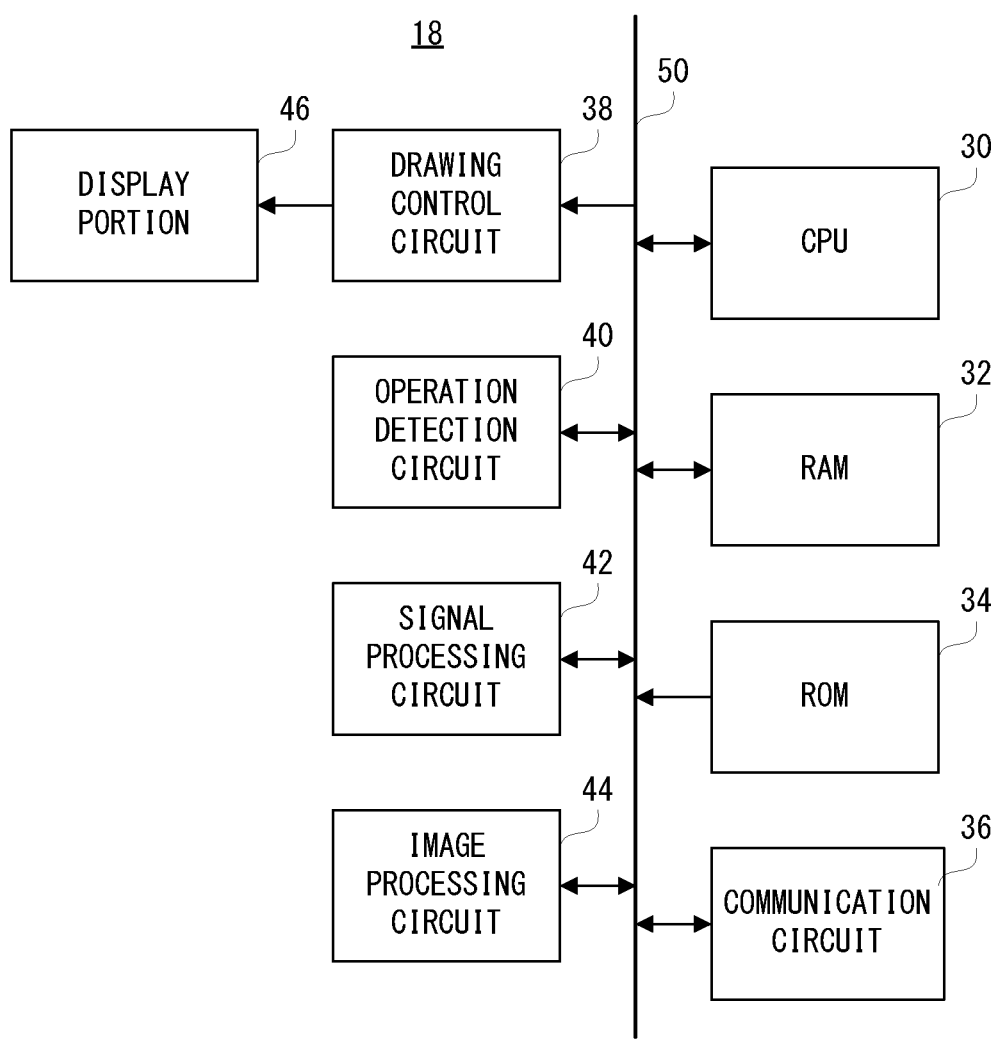
FIG. 2 is a block diagram showing electric structure of a display apparatus shown in FIG. 1.

FIG. 2 is a block diagram showing electric structure of the display apparatus 18 shown in FIG. 1.

With reference to FIG. 2, the display apparatus 18 that is the first embodiment of the present invention includes a CPU 30. The CPU 30 is connected, via a bus 50, with a RAM 32, a ROM 34, a communication circuit 36, a drawing control circuit 38, an operation detection circuit 40, a signal processing circuit 42 and an image processing circuit 44. Furthermore, the touch controller 20a is connected to the CPU 30 via the communication circuit 36, and the display portion 46 is connected to the drawing control circuit 38.

The CPU 30 is in charge of overall control of the display apparatus 18. The RAM 32 is used as a working area and a buffer area for the CPU 30. The ROM 34 stores a control program for controlling the display apparatus 18 and data of various set-up information on the display apparatus 18. However, replacing with the ROM 34, other nonvolatile memory such as a flash memory, an HDD and so on may be provided.

The communication circuit 36 is an interface for performing communication with the touch controller 20a. As this communication circuit 36, a wireless LAN, a cable LAN, an RS-232C interface, a USB, a DDC/CI (Display Data Channel Command Interface), an HDMI-CEC (High Definition Multimedia Interface Consumer Electronics Control), etc. can be used, for example.

The drawing control circuit 38 is a controller for generating and outputting a video or image to be displayed on the display portion 46. The drawing control circuit 38 includes a GPU, a VRAM, etc., and under instructions of the CPU 30, the GPU generates in the VRAM display image data for displaying on the display portion 46 various kinds of screens based on image generating data that is stored in the RAM 32, and outputs the generated display image data to the display portion 46.

Figure 4:
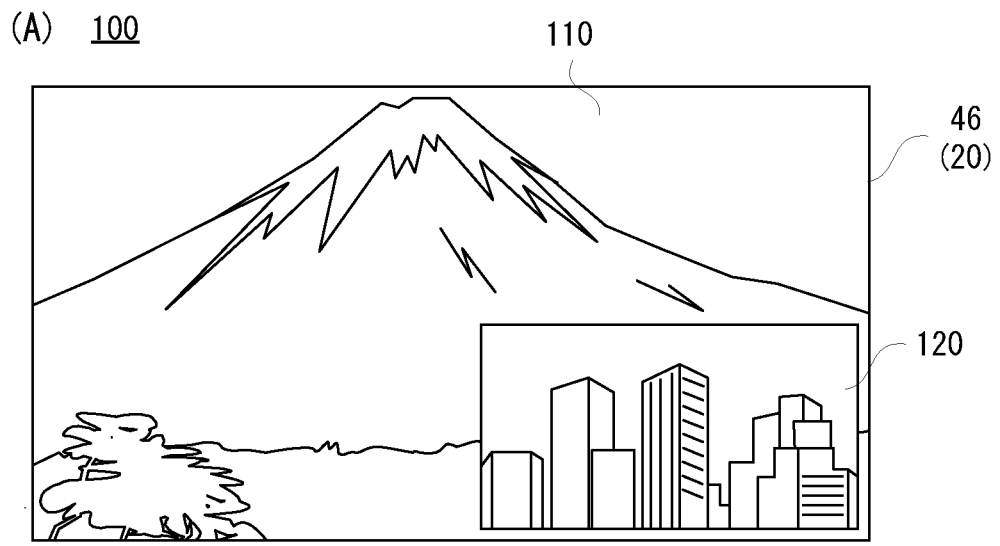
FIGS. 4(A) and 4(B) are illustration views showing an operation example and an example of a touch screen in a first embodiment.
Figure 4:
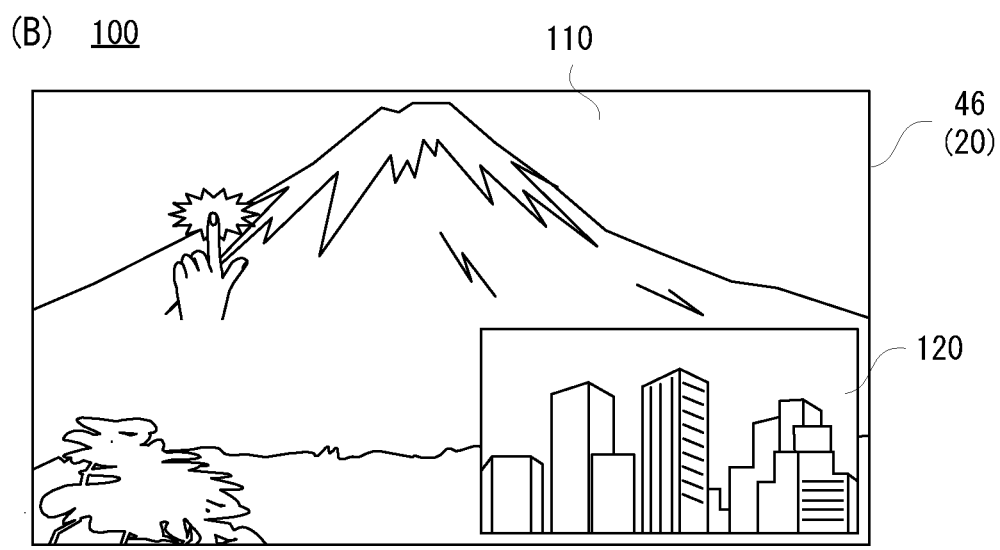

In this first embodiment, the GPU generates in the VRAM first screen data for displaying a touch screen 100 (see FIG. 4) on the display portion 46 with using the video or image that is input from the first computer 14, and displays a first screen 110 (see FIG. 4) according to the generated first screen data on the display portion 46. Furthermore, the GPU generates in the VRAM second screen data for displaying the touch screen 100 (see FIG. 4) on the display portion 46 with using the video or image that is input from the second computer 16, and displays a second screen 120 (see FIG. 4) according to the generated second screen data on the display portion 46.

The display portion 46 outputs data about the video or image that is applied from the drawing control circuit 38. In addition, as described above, the touch panel 20 is provided on the display surface of the display portion 46. This is true for a case where the touch screen 100 is displayed in the following.

The operation detection circuit 40 is a various kinds of operating buttons (operating keys) provided in the display apparatus 18 and a remote control reception portion, or receives an operation signal that is transmitted when the operating button is operated by the user, and receives a remote control signal (infrared signal) that is transmitted from the remote controller (not shown). For example, the CPU 30 moves a display position of a picture-in-picture (PIP) according to the operation signal or remote control signal that is received by the operation detection circuit 40, or turns on or turns off a power supply of the display apparatus 18, or sets up and changes (adjusts) various kinds of information about the display apparatus 18. As the various kinds of information, brightness, luminosity, contrast, a color temperature, a horizontal position, a vertical position, etc. correspond.

The signal processing circuit 42 is an interface for inputting the first screen data corresponding to the first screen 110, which is applied from the first computer 14 and the second screen data corresponding to the second screen 120, which is applied from the second computer 16, and DisplayPort, HDMI (registered trademark), DVI, D-SUB, etc. can be utilized for it. However, it is possible to input not only data of the video or image but data of a voice or sound.

The image processing circuit 44 applies working and processing to the first screen data or the second screen data that is input from the signal processing circuit 42 while using some areas of the RAM 32 as a VRAM. It should be noted that the working and processing means adjustment of brightness, adjustment of shade of color, adjustment of image quality, trimming, compositing, etc., for example.

Figure 3:
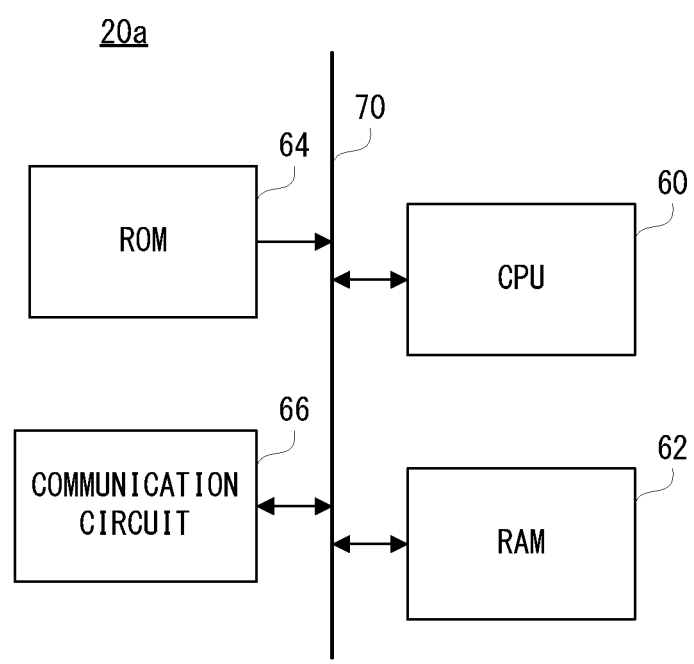
FIG. 3 is a block diagram showing electric structure of a touch controller shown in FIG. 1.

FIG. 3 is a block diagram showing electric structure of the touch controller 20a shown in FIG. 1.

As shown in FIG. 3, the touch controller 20a includes a CPU 60. The CPU 60 is connected via a bus 70 with a RAM 62, a ROM 64 and a communication circuit 66.

The CPU 60 is in charge of overall control of the touch controller 20a. The RAM 62 is used as a working area and a buffer area for the CPU 60. The ROM 64 stores a control program for controlling the touch controller 20a and data about various set-up information of the touch controller 20a.

The communication circuit 66 is an interface for performing communication with the first computer 14 and the display apparatus 18. As this communication circuit 66, a wireless LAN, a cable LAN, an RS-232C interface, a USB, a DDC/CI, an HDMI-CEC, etc. can be used, for example.

Figure 5:
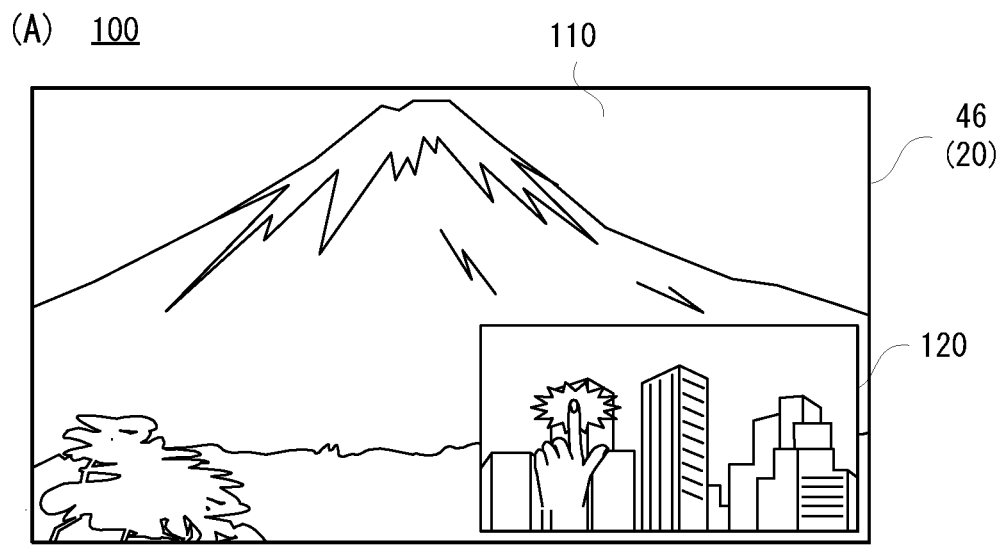
FIGS. 5(A) and 5(B) are illustration views showing another operation example and another example of the touch screen in the first embodiment.
Figure 5:
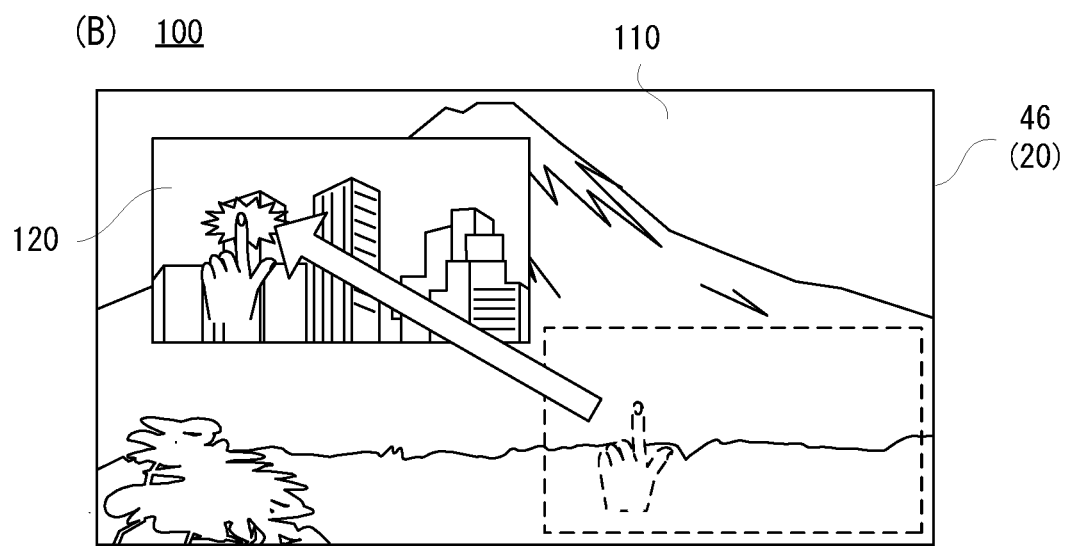

FIGS. 4(A) and 4(B) are illustration views showing an operation example and an example of a touch screen 100 in the first embodiment. FIGS. 5(A) and 5(B) are illustration views showing another operation example and another example of the touch screen 100 in the first embodiment.

In the information processing system 10 thus constituted, as shown in FIG. 4(A), the first screen 110 is displayed in a whole display range of the display portion 46 (full-screen displayed), and the second screen 120 is displayed in front (this side) of the first screen 110 as a PIP so as to be overlapped with a part of the display range of the first screen 110. Accordingly, it is possible to display the first screen 110 and the second screen 120 on the display portion 46.

Furthermore, a display range (size) of the second screen 120 is smaller than that of the first screen 110. Then, FIG. 4(A) shows an example that the second screen 120 is displayed at the lower right in the display range of the display portion 46. Furthermore, FIG. 4(A) shows an example that the first screen 110 and the second screen 120 are different screens, and the first screen 110 is a screen of scenery of a mountain and the second screen 120 is a screen of scenery of buildings.

At this time, the first screen data that corresponds to the first screen 110 and is generated with using a video or image that is input from the first computer 14 and the second screen data that corresponds to the second screen 120 and is generated with using a video or image that is input from the second computer 16 are generated in the VRAM of the drawing control circuit 38. Then, the first screen data and the second screen data are output to the display portion 46 in an overlapped manner, whereby the above-described PIP display can be performed.

Then, as shown in FIG. 4(B), it is possible for the user to perform a touch input with using the touch panel 20 in a touch input mode of the information processing system 10.

In such the information processing system 10, the user can operate the first computer 14 by means of the touch input, thereby to draw (display) a handwritten character etc. on the first screen 110, select a file, or select a button (icon) for performing a function.

However, when the second screen 120 is displayed in a position where the user of the information processing system 10 wants to show another user the first screen 110, for example, the second screen 120 may become obstructive if the second screen 120 is displayed. In this case, although the display position of the second screen 120 can be moved to a desired position by operating the remote controller, it is needed to suspend the touch input and then operate the remote controller, and therefore, work is troublesome.

Therefore, in the first embodiment, as shown in FIGS. 5(A) and 5(B), when a touch input designates the second screen 120, the display position of the second screen 120 is moved according to a change of touch coordinates of the touch input. Furthermore, although illustration is omitted, when a touch-off is performed after the display position of the second screen 120 is moved, the display position of the second screen 120 is a position at the time when the touch-off is performed.

Thus, since the user can move the second screen 120 by means of a touch input when the second screen 120 is displayed in a position where the user wants to touch and becomes obstructive, it is possible to do work smoothly. In addition, the user can operate the first computer 14 by performing a touch input outside the display range of the second screen 120.

The above-described operations of the information processing system 10 can be implemented by executing by the CPU 30 of the display apparatus 18 an information processing program for the display apparatus 18 that is stored in the RAM 32 and by executing by the CPU 60 of the touch controllers 20a an information processing program for the touch controllers 20a that is stored in the RAM 62. Specific processing will be described in the following with using a flowchart(s).

Figure 6:
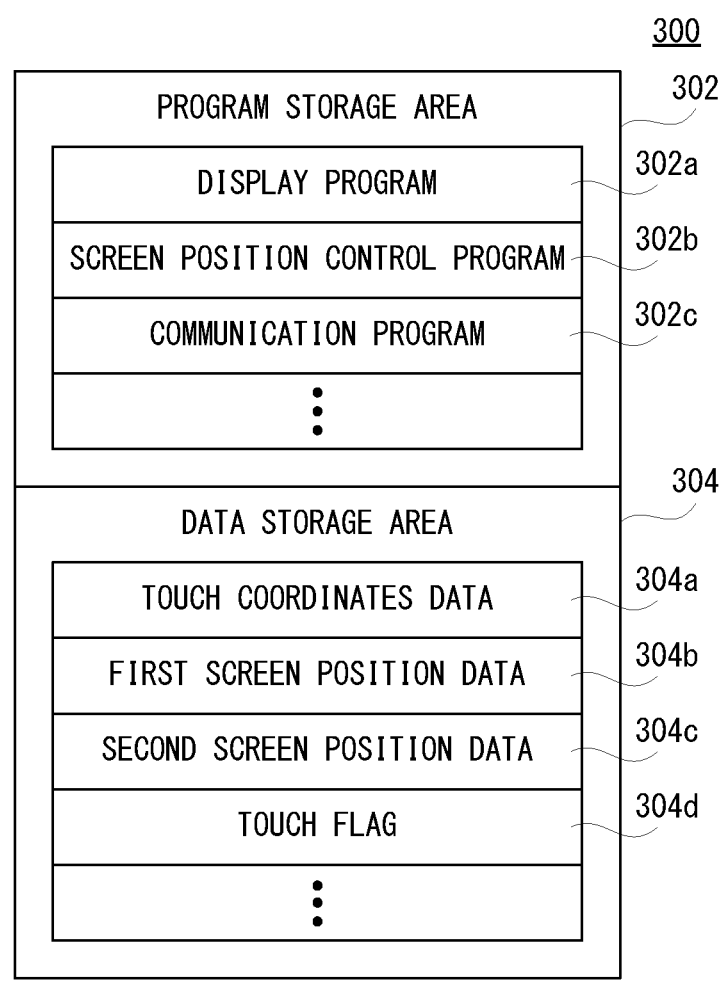
FIG. 6 is an illustration view showing an example of a memory map of a RAM shown in FIG. 2.

FIG. 6 shows an example of a memory map of the RAM 32 of the display apparatus 18 shown in FIG. 2. As shown in FIG. 6, the RAM 32 includes a program storage area 302 and a data storage area 304. In the program store area 302, as described above, the information processing program for the display apparatus 18 is stored. The information processing program for display apparatus 18 includes a display program 302a, a screen position control program 302b and a communication program 302c.

The display program 302a is a program for outputting the first screen data to the display portion 46 such that the first screen 110 is displayed in the display position according to first screen position data 304b described later and the second screen data to the display portion 46 such that the second screen 120 is displayed in the display position according to second screen position data 304c described later.

The screen position control program 302b is a program for controlling the first screen position data 304b and the second screen position data 304c. The CPU 30 that executes the screen position control program 302b, for example updates the second screen position data 304c with using touch coordinates data 304a described later when a touch input designates the second screen 120.

The communication program 302c is a program for performing communication with the touch controller 20a. Specifically, the communication program 302c is a program for receiving touch coordinates data 404a (see FIG. 7) that is transmitted from the touch controller 20a. Furthermore, the communication program 302c is also a program for transmitting updated first screen position data 304b or updated second screen position data 304c to the touch controller 20a when the first screen position data 304b or the second screen position data 304c is updated by the screen position control program 302b.

In addition, although illustration is omitted, programs for selecting and performing various kinds of functions or actions, other application programs, etc. are also stored in the program storage area 302.

The data storage area 304 is stored with the touch coordinates data 304a, the first screen position data 304b, the second screen position data 304c, a touch flag 304d, etc.

The touch coordinates data 304a is touch coordinates data according to the touch coordinates data 404a that is transmitted from the touch controller 20a, and stored according to a time series. It should be noted that the touch coordinates data 304a is cleared if used for the processing by the CPU 30.

The first screen position data 304b is a collection the coordinates data each indicating the display position of the first screen 110. In this first embodiment, since the first screen 110 is displayed in a full-screen manner, the first screen position data 304b is assumed as a collection the coordinate data that show a whole display range of the display portion 46.

The second screen position data 304c is a collection the coordinates data each indicating the display position of the second screen 120. In this first embodiment, as described above, when a touch input designates the second screen 120, the display position of the second screen 120 moves according to a change of the touch coordinates of the touch input. Then, when the display position of the second screen 120 moves, according to a change of the touch coordinates of the touch input, the second screen position data 304c is updated.

The touch flag 304d is a flag for determining whether a touch input exists inside the display range of the first screen 110. In the display apparatus 18 of the first embodiment, when the touch coordinates data 404a that is transmitted from the touch controller 20a is received, the touch flag 304d is turned on. Whereas, when the touch coordinates data 404a is not received for a predetermined time period, the touch flag 304d is turned off.

In addition, although illustration is omitted, the data storage area 304 is further stored with other data necessary for execution of the information processing program, such as the operation data from the remote controller and the operating button etc., and provided with a timer(s) (counter(s)) and a register(s) required for execution of the information processing program.

Figure 7:
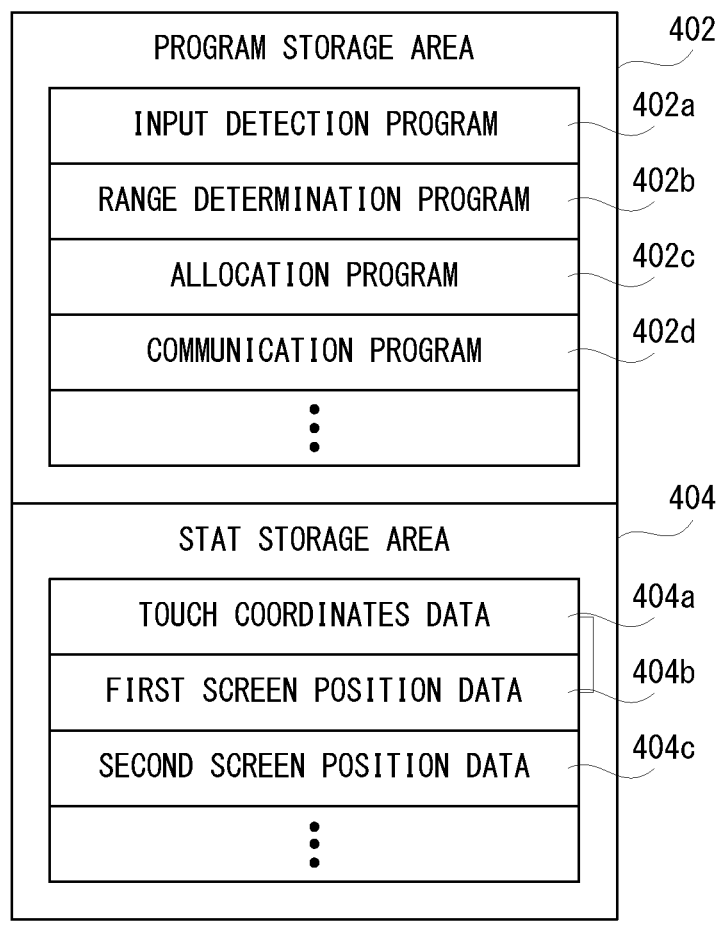
FIG. 7 is an illustration view showing an example of a memory map of a RAM shown in FIG. 3.

FIG. 7 shows an example of a memory map of the RAM 62 of the touch controller 20a shown in FIG. 3. As shown in FIG. 7, the RAM 62 includes a program storage area 402 and a data storage area 404. As described above, an information processing program for the touch controllers 20a is stored in the program store area 402. The information processing program for the touch controller 20a includes an input detection program 402a, a range determination program 402b, an allocation program 402c and a communication program 402d.

The input detection program 402a is a program for detecting the touch coordinates data that is input from the touch panel 20, and storing the same into the data storage area 404 as the touch coordinates data 404a.

The range determination program 402b is a program for determining whether the coordinates of the touch coordinates data 404a that is detected by the input detection program 402a is inside the display range of the second screen 120. Specifically, the CPU 60 that executes the range determination program 402b determines, with reference to second screen position data 404c described later, whether the coordinates of the touch coordinates data 404a are included in the collection the coordinates data each indicating the display position of the second screen 120. Furthermore, in the first embodiment, since the first screen 110 is displayed in a whole display range of the display portion 46, the CPU 60 determines that the coordinates of the touch coordinates data 404a are inside the display range of the first screen 110 when the coordinates are outside the display range of the second screen 120.

The allocation program 402c is a program for allocating such that the touch coordinates data 404a is transmitted to the display apparatus 18 when it is determined by the CPU 60 executing the range determination program 402b that the coordinates of the touch coordinates data 404a concerned are inside the display range of the second screen 120. Furthermore, the allocation program 402c is also a program for allocating such that the touch coordinates data 404a is transmitted to the first computer 14 when it is determined that the coordinates of the touch coordinates data 404a are outside the display range of the second screen 120, that is, when it is determined that the coordinates of the touch coordinates data 404a are inside the display range of the first screen 110.

The communication program 402d is a program for performing communication with the first computer 14 or the display apparatus 18. Specifically, the CPU 60 that executes the communication program 402d transmits to the display apparatus 18 the touch coordinates data 404a that is allocated so as to be transmitted to the display apparatus 18 by the allocation program 402c. Furthermore, the CPU 60 transmits to the first computer 14 the touch coordinates data 404a that is allocated by the allocation program 402c so as to be transmitted to the first computer 14. Furthermore, the communication program 402d is also a program for receiving the first screen position data 304b or the second screen position data 304c that is transmitted from the display apparatus 18.

In addition, a program(s) for selecting and executing various kinds of functions or actions, other application programs, etc. may be stored in the program storage area 402.

In the data storage area 404, the touch coordinates data 404a, first screen position data 404b, second screen position data 404c, etc. are stored.

The touch coordinates data 404a is touch coordinates data that is detected by the input detection program 402a, and stored according to a time series. It should be noted that the touch coordinates data 404a is cleared if transmitted to the first computer 14 or the display apparatus 18.

The first screen position data 404b is a collection the coordinates data each indicating the display position of the first screen 110. Furthermore, when the first screen position data 304b that is transmitted from the display apparatus 18 is received, the first screen position data 404b is updated by a content according to the first screen position data 304b.

The second screen position data 404c is a collection the coordinates data each indicating the display position of the second screen 120. Furthermore, when the second screen position data 304c that is transmitted from the display apparatus 18 is received, the second screen position data 404c is updated by a content according to the second screen position data 304c.

In addition, although illustration is omitted, a timer(s) (counter(s)), a register(s), etc. required for execution of the information processing program are provided in the data storage area 404.

Figure 8:
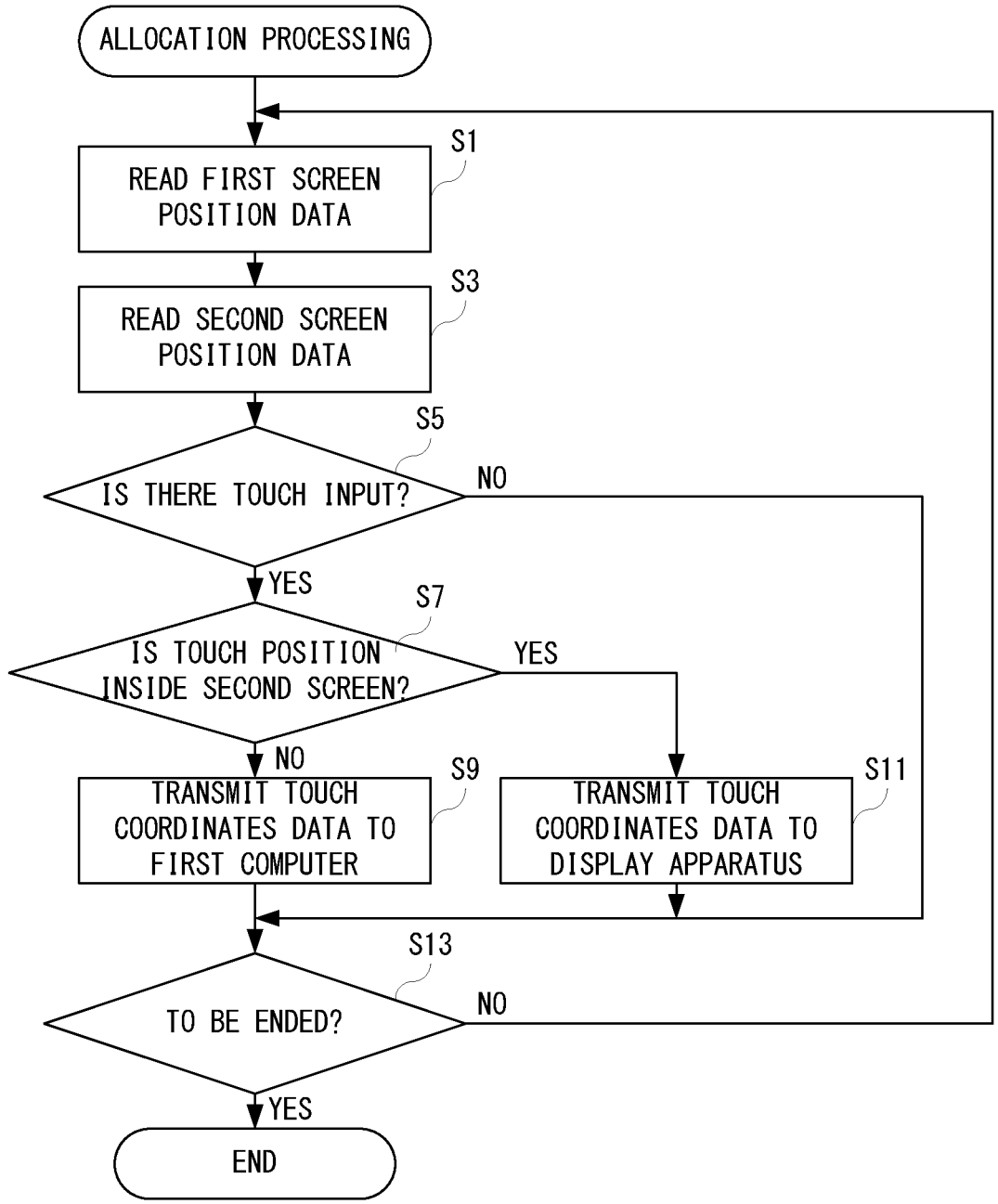
FIG. 8 is a flowchart showing an example of allocation processing by a CPU shown in FIG. 3.

FIG. 8 is a flowchart showing an example of allocation processing by the CPU 60 of the touch controller 20a shown in FIG. 3. If the touch panel 20 is activated, as shown in FIG. 8, the CPU 60 starts the allocation processing, and reads the first screen position data 404b in a step S1. Next, the second screen position data 404c is read in a step S3.

Then, it is determined whether there is any touch input in a step S5. Here, it is determined whether the touch coordinates data 404a corresponding to a touch input is stored in the data storage area 404 in a current frame. In the following, this is true for a case where it is determined whether there is any touch input.

If "NO" is determined in the step S5, that is, if there is no touch input, the CPU 60 proceeds to a step S13. On the other hand, if "YES" is determined in the step S5, that is, if there is a touch input, it is determined in a step S7 whether a touch position is inside the second screen 120, that is, whether the touch input designates the second screen 120. If "NO" is determined in the step S7, that is, if the touch position is outside the second screen 120, in a step S9, the CPU 60 transmits the touch coordinates data 404a to the first computer 14, and then, proceeds to the step S13.

On the other hand, if "YES" is determined in the step S7, that is, if the touch position is inside the second screen 120, in a step S11, the CPU 60 transmits the touch coordinates data 404a to the display apparatus 18, and then, proceeds to the step S13.

In the step S13, it is determined whether the processing is to be ended. Here, it is determined whether an end instruction is input by the user. If "NO" is determined in the step S13, that is, if not to be ended, the CPU 60 returns to the step S1 with no operation. On the other hand, if "YES" is determined in the step S13, that is, if to be ended, the CPU 60 terminates the allocation processing.

Figure 9:
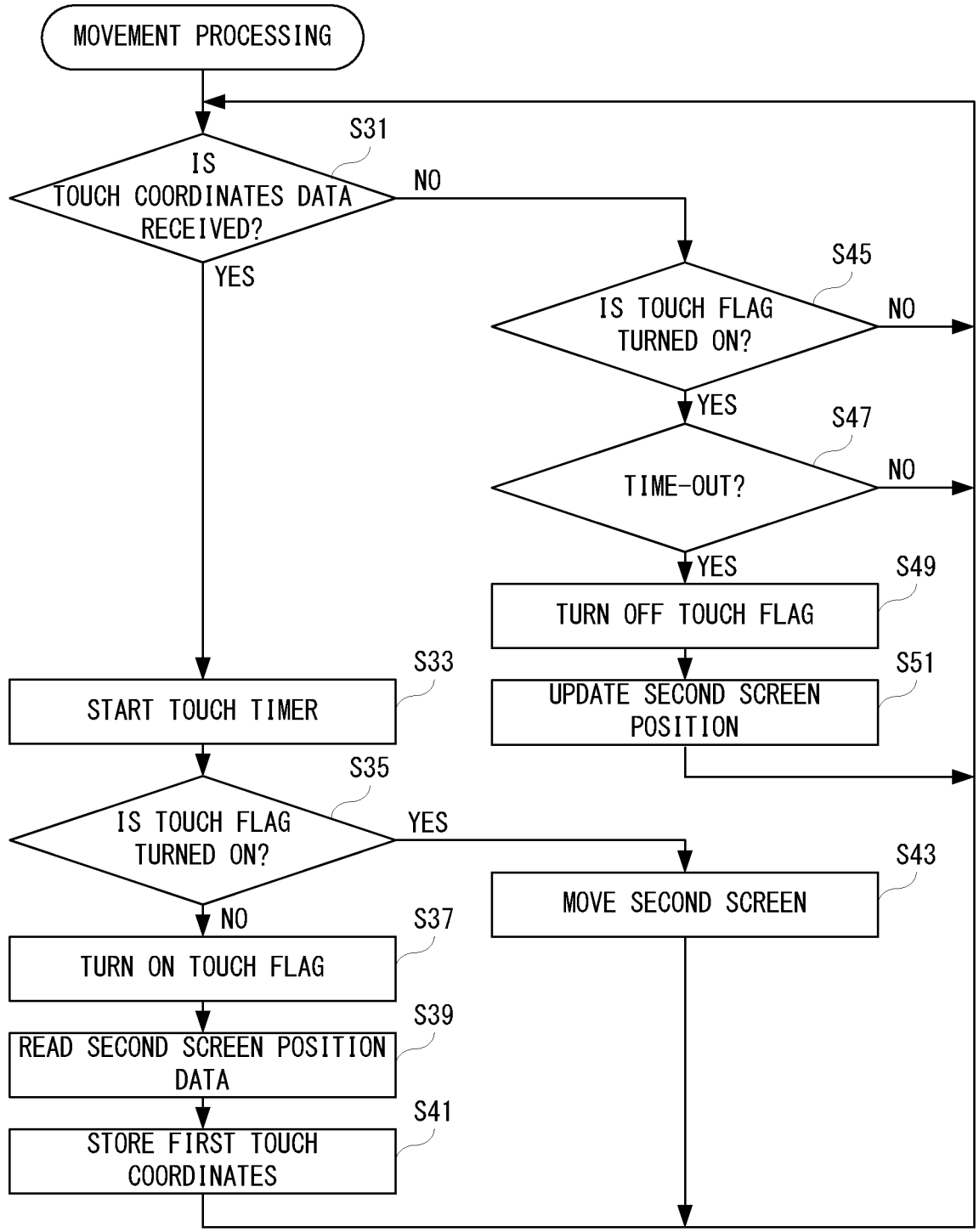
FIG. 9 is a flowchart showing an example of moving processing of by a CPU shown in FIG. 2.

FIG. 9 is a flowchart showing an example of moving processing by the CPU 30 of the display apparatus 18 shown in FIG. 2. If the display apparatus 18 is activated, as shown in FIG. 9, the CPU 30 starts the moving processing, and determines, in a step S31, whether the CPU 30 receives the touch coordinates data 404a.

If "YES" is determined in the step S31, that is, if the touch coordinates data 404a is received, after starting a touch timer in a step S33, the CPU 30 determines whether the touch flag 304d is turned on in a step S35.

If "NO" is determined in the step S35, that is, if the touch flag 304d is turned off, the CPU 30 turns on the touch flag 304d in a step S37, and reads the second screen position data 304c in a step S39. Then, the CPU 30 stores in a step S41 first touch coordinates, i.e., the touch coordinates data 404a that is received in the step S31, and then, returns to the step S31.

On the other hand, if "YES" is determined in the step S35, that is, if the touch flag 304d is turned on, the CPU 30 moves, in a step S43, the second screen 120 according to the touch coordinates data 404a that is received in the step S31, and then, returns to the step S31. In addition, in the step S43, the second screen position data 404c in a movement destination is calculated when moving the second screen 120.

Furthermore, if "NO" is determined in the step S31, that is, if the touch coordinates data 404a is not received, the CPU 30 determines, in a step S45, whether the touch flag 304d is turned on.

If "NO" is determined in the step S45, that is, if the touch flag 304d is turned off, the CPU 30 returns to the step S31 with no operation. On the other hand, if "YES" is determined in the step S45, that is, if the touch flag 304d is turned on, the CPU 30 determines whether it is time-out in a step S47. Specifically, in the step S47, the CPU 30 determines, with using the touch timer, whether a time period that the touch coordinates data 404a is not received exceeds a predetermined time period.

If "NO" is determined in the step S47, that is, if it is not time-out, the CPU 30 returns to the step S31. If "YES" is determined in the step S47, that is, if it is time-out, the CPU 30 turns off the touch flag 304d in a step S49. In addition, in the step S49, the touch timer is also stopped.

Then, in a step S51, the CPU 30 updates the second screen position data 304c according to the touch coordinates data 404a that is received at last, and then, returns to the step S31.

According to this first embodiment, since when a touch input designates the second screen 120, the display position of the second screen 120 is moved according to a change of the touch coordinates of the touch input the display position of the second screen 120 can be moved with a simple operation.

Furthermore, according to the first embodiment, since the touch coordinates data 404a is transmitted to the first computer 14 when it is determined that it is an input operation to an outside of the display range of the second screen 120, it is possible to operate the first computer 14 by a touch input as before.

Second Embodiment

Since an information processing system 10 of the second embodiment is the same or similar to the first embodiment except that a movement prohibition range 130 that a movement of the second screen 120 is prohibited is set up in the display range of the touch screen 100, and when a touch-off is performed in a state where the movement prohibition range 130 is overlapped with the display range of the second screen 120 to be moved, the display position of the second screen 120 is not moved, only a content different from the first embodiment will be described and thus a duplicate description will be omitted.

Figure 10:
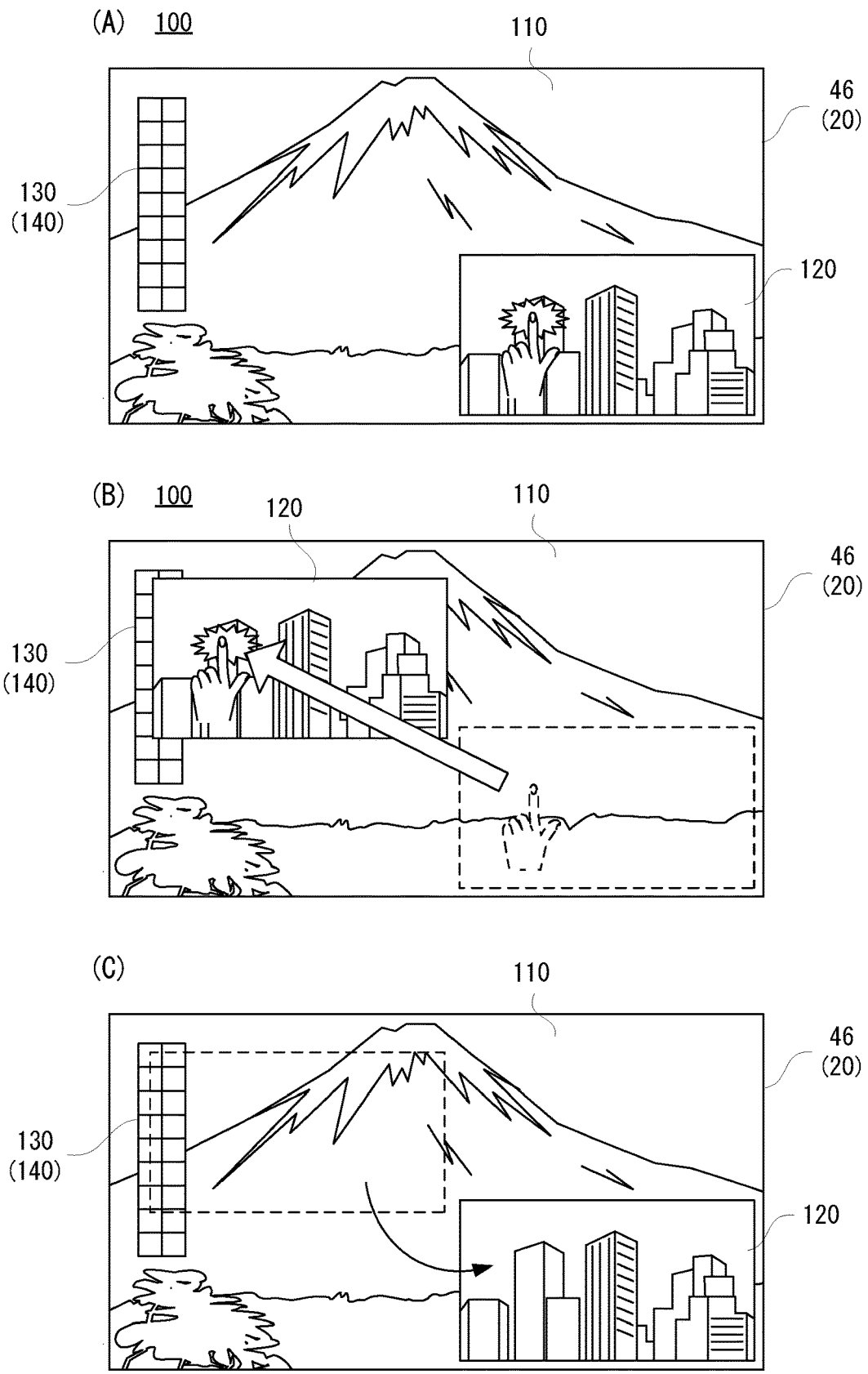
FIGS. 10(A)-10(C) are illustration views showing an operation example and an example of a touch screen in a second embodiment.

FIGS. 10(A)-10(C) are illustration views showing an operation example and an example of a touch screen in the second embodiment.

As shown in FIG. 10(A), the touch screen 100 is displayed with a menu 140 that includes buttons for setting-up (selecting) according to an operation by an operator functions (modes) such as a pen (touch input), an eraser, thickness of lines, color selection, etc. and buttons for performing predetermined actions concerning with drawing, such as restoring, saving, etc. Then, in this second embodiment, a display range of the menu 140 is set up as the movement prohibition area 130.

As shown in FIG. 10(B), when a touch input designates the second screen 120, the display position of the second screen 120 is moved according to a change of the touch coordinates of the touch input, like the first embodiment. However, when a touch-off is performed in a state where the display range of the second screen 120 to be moved and the movement prohibition range 130 are overlapped with each other, the display position of the second screen 120 is not moved. As shown in FIG. 10(C), for example, when a touch-off is performed in a state where the display range of the second screen 120 to be moved and the movement prohibition range 130 are overlapped with each other, the display position of the second screen 120 returns to a previous display position thereof.

In addition, although illustration is omitted, when a touch-off is performed in a state where the display range of the second screen 120 to be moved and the moving prohibition area 130 are not overlapped with each other, the display position of the second screen 120 is updated, like the first embodiment.

Furthermore, in the second embodiment, movement prohibition range data is stored in the data storage area 304 of the RAM 32 of the display apparatus 18 and the data storage area 404 of the RAM 62 of the touch controller 20a, respectively.

The movement prohibition range data is a collection the coordinates data each indicating the movement prohibition range. Since the display range of the menu 140 is set up as the movement prohibition range 130 in this second embodiment, for example, the movement prohibition range data becomes a collection the coordinates data each indicating the display range of the menu 140.

In the following, moving processing by the CPU 30 of the display apparatus 18 in the second embodiment will be described with using a flowchart; however, the processing in the steps S31-S49 and step S51 are the same or similar to those of the first embodiment, and therefore, a description on a duplicate content will be omitted. In addition, since the allocation processing is the same or similar to that of the first embodiment, a duplicate description will be omitted.

Figure 11:
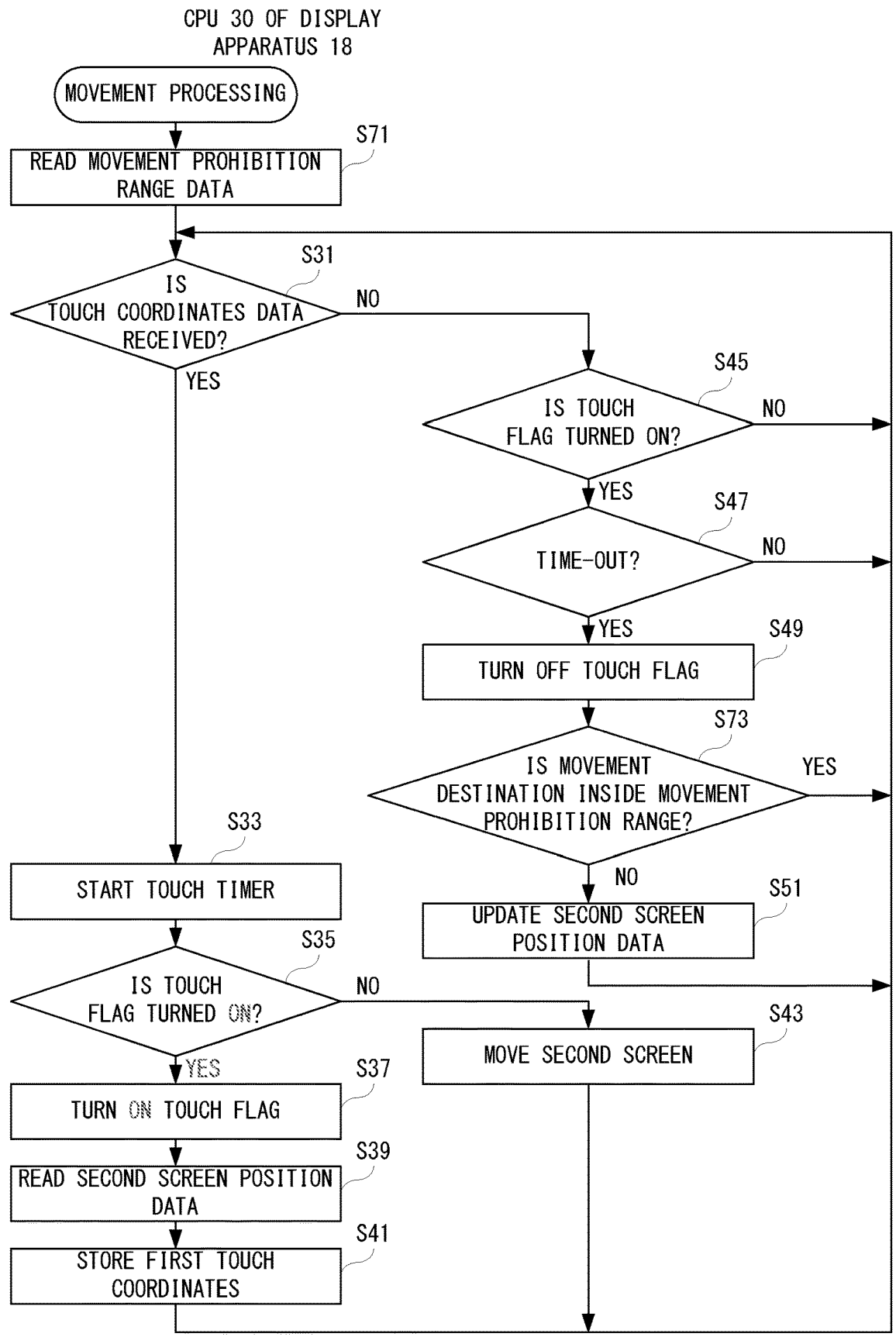
FIG. 11 is a flowchart showing an example of moving processing of the CPU in the second embodiment.

FIG. 11 is a flowchart showing an example of the moving processing by the CPU 30 in the second embodiment.

As shown in FIG. 11, if the moving processing is started, in the second embodiment, the CPU 30 reads movement prohibition range data in a step S71, and then, proceeds to a step S31.

Furthermore, after turning off the touch flag 304d in a step S49, the CPU 30 determines in a step S73 whether a movement destination of the second screen 120 is within the movement prohibition range. Specifically, in the step S73, the movement prohibition range data and the second screen position data 304c according to the touch coordinates data 404a that is received at last are compared with each other such that it is determined whether at least a part of the second screen position data 404c at the movement destination is included in a collection the coordinates data each indicating the movement prohibition range.

If "NO" is determined in the step S73, that is, if the movement destination of the second screen 120 is not within the movement prohibition range, the CPU 30 proceeds to a step S51, and updates the second screen position data 304c, and then, returns to the step S31. On the other hand, if "YES" is determined in the step S73, that is, if the movement destination of the second screen 120 is within the movement prohibition range, the CPU 30 returns to the step S31 without updating the second screen position data 304c.

In this second embodiment, the movement prohibition range 130 that a movement of the second screen 120 is prohibited is set up, and when a touch-off is performed in a state where the display range of the second screen 120 to be moved and the movement prohibition range 130 are overlapped with each other, the display position of the second screen 120 is not moved. Accordingly, if a position wishing not to move the second screen 120, such as a display range of the buttons for setting functions, for example, is set up as the movement prohibition range 130, the second screen 12 is not moved accidentally to the position wishing not to move the second screen 120.

Third Embodiment

Since the third embodiment is the same or similar to the second embodiment except the movement prohibition range 130 is set up according to the touch input by the user, only a content different from that of the second embodiment will be described, and therefore, a duplicate description will be omitted.

In an information processing system 10 of the third embodiment, if the user hand-writes a character, a figure, a sign (hereinafter, called "character etc.") with fingers on the touch panel 20, a handwritten character etc. is drawn (displayed) on the touch screen 100. Then, if the user hand-writes the character etc., lines according to loci of the handwritten input are displayed (drawn) on the touch screen 100. That is, an image comprising the handwritten character etc. (hereinafter, called "handwritten image") is displayed on the touch screen 100.

Figure 12:
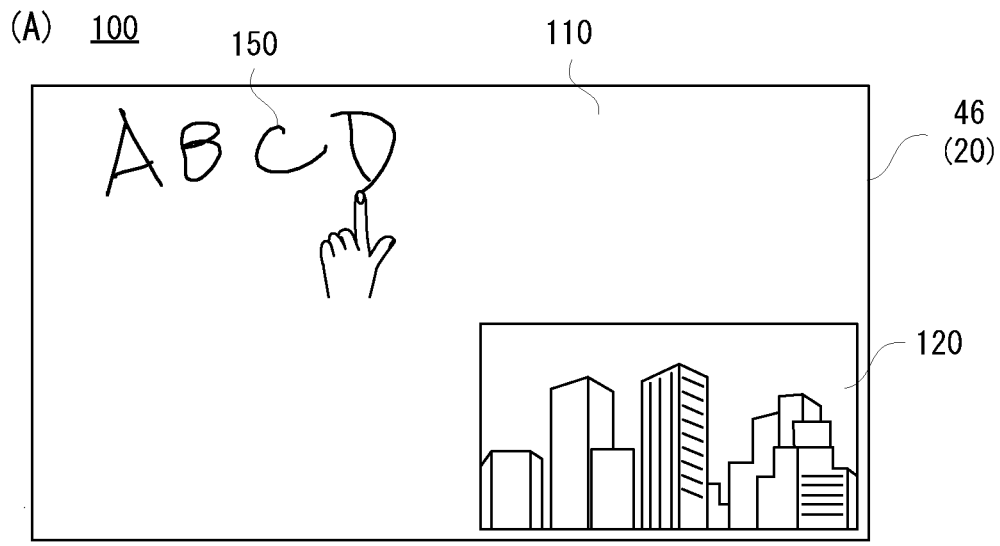
FIGS. 12(A) and 12(B) are illustration views showing an operation example and an example of a touch screen in a third embodiment.
Figure 12:
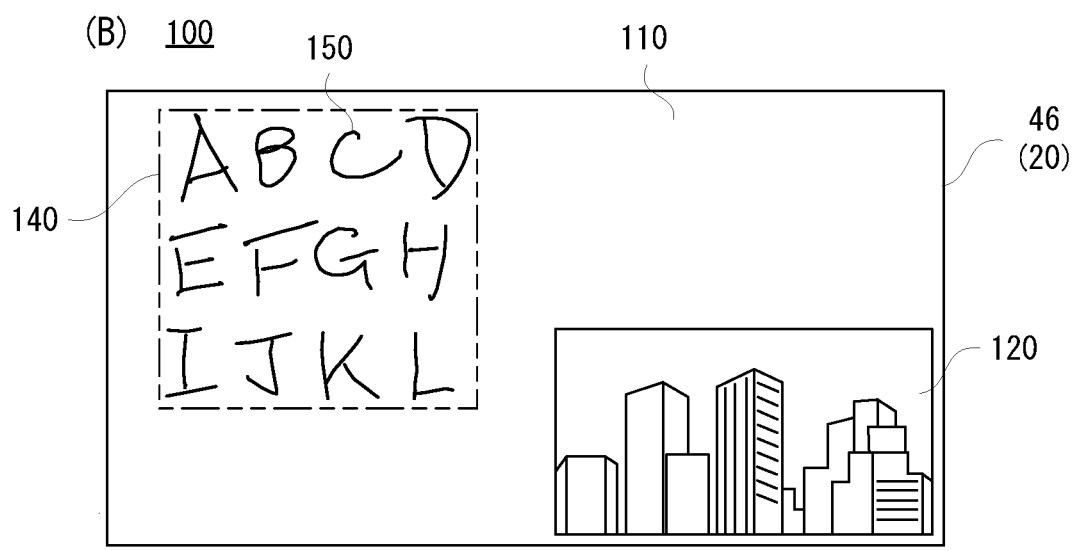

As shown in FIG. 12(A), for example, if a pen button included in the menu 140 is selected (touched) a hand-writing input mode that the user hand-writes a character etc. is set up, and in the hand-writing input mode, the user can hand-write a character etc. with using a finger.

Then, as shown in FIG. 12(B), in this third embodiment, a display range 150 of the handwritten image including the character etc. hand-written by the user is set up as the movement prohibition area 130.

In addition, a method of setting up the movement prohibition area 130 is not limited to the above-described method. The movement prohibition range 130 may be set up by touching two points on the touch screen 100 by the user, or by displaying a frame indicating the movement prohibition range 130 on the touch screen 100 and then by changing a size of the frame or moving the frame by the user, for example. Thus, the range of the movement prohibition area 130 may be designated by the touch input by the user.

According to this third embodiment, since the movement prohibition area 130 can be set up according to the touch input by the user, it is possible to freely set up the movement prohibition area 130 wishing not to move the second screen 120 by the user himself/herself.

It should be noted that the specific numerical values, screen configurations, etc. described in the above-described embodiments are only examples, and to be set or changed appropriately in accordance with the actual products.

Furthermore, as long as the same result can be obtained, an execution order of respective steps in the flowcharts shown in the above-described embodiments may be suitably changed.

Although the present invention has been mentioned and illustrated in detail, it is clearly understood that the same is by way of illustration and example only and is not to be taken by way of limitation, the spirit and scope of the present invention being limited only by the terms of the appended claims.

What is claimed is:

1. An information processing apparatus that comprises a display apparatus configured to display a first screen that corresponds to first screen data that is input from a first external computer and a second screen that corresponds to second screen data that is input from a second external computer, and is displayed in front of the first screen concerned so as to be fit into a display range of the first screen concerned on a display surface and a touch panel that is provided on the display surface of the display apparatus, wherein
the touch panel is connected to the display apparatus and the first external computer and comprises a touch controller, the touch controller performing:
detecting touch coordinates corresponding to a position that is designated on the touch panel by a touch operation by a user;
determining, based on the detected the touch coordinates, whether the touch operation designates the second screen; and
transmitting touch coordinates data corresponding to the touch coordinates to the display apparatus when it is determined that the touch operation designates the second screen, and
transmitting the touch coordinates data corresponding to the touch coordinates to the first external computer when it is determined that the touch operation designates an outside of a display range of the second screen, and
the display apparatus comprises a display controller, the display controller performing:
receiving the coordinates data that is transmitted from the touch controller, and
moving a display position of the second screen according to a change of the touch coordinates corresponding to the received touch coordinates data,
wherein the display controller further performs:
setting up a movement prohibition range that is a range prohibiting a movement of the second screen,
determining whether the touch coordinates corresponding to the received touch coordinates data is included within the movement prohibition range, and
not moving the second screen when it is determined that the touch coordinates corresponding to the received touch coordinates data is included within the movement prohibition range.

2. A non-transitory computer-readable storage medium that stores an information processing program executed by one or more computer processors of an information processing apparatus that comprises a display apparatus configured to display a first screen that corresponds to first screen data that is input from a first external computer and a second screen that corresponds to second screen data that is input from a second external computer, and is displayed in front of the first screen concerned so as to be fit into a display range of the first screen concerned on a display surface and a touch panel that is provided on the display surface of the display apparatus and connected to the display apparatus and the first external computer, wherein the information processing program causes the one or more computer processors to perform:
detecting touch coordinates corresponding to a position of the touch panel designated by a touch operation on the touch panel by a user;
determining, based on the detected the touch coordinates, whether the touch operation designates the second screen;
transmitting touch coordinates data corresponding to the touch coordinates to the display apparatus when it is determined that the touch operation designates the second screen;
transmitting the touch coordinates data corresponding to the touch coordinates to the first external computer when it is determined that the touch operation designates an outside of a display range of the second screen;
receiving the transmitted the touch coordinates data; and
moving a display position of the second screen according to a change of the touch coordinates corresponding to the received touch coordinates data;
wherein the one or more computer processor further performs:
setting up a movement prohibition range that is a range prohibiting a movement of the second screen, determining whether the touch coordinates corresponding to the received touch coordinates data is included within the movement prohibition range, and not moving the second screen when it is determined that the touch coordinates corresponding to the received touch coordinates data is included within the movement prohibition range.

3. An information processing method performed in an information processing apparatus that comprises a display apparatus configured to display a first screen that corresponds to first screen data that is input from a first external computer and a second screen that corresponds to second screen data that is input from a second external computer, and is displayed in front of the first screen concerned so as to be fit into a display range of the first screen concerned on a display surface and a touch panel that is provided on the display surface of the display apparatus and connected to the display apparatus and the first external computer, the information processing apparatus is configured to perform:

detecting touch coordinates corresponding to a position of the touch panel designated on the touch panel by a touch operation by a user;

determining, based on the detected the touch coordinates, whether the touch operation designates the second screen;

transmitting touch coordinates data corresponding to the detected touch coordinates to the display apparatus when it is determined that the touch operation designates the second screen;

transmitting the touch coordinates data corresponding to the touch coordinates to the first external computer when it is determined that the touch operation designates an outside of a display range of the second screen;

receiving the transmitted the touch coordinates data; and moving a display position of the second screen of the display apparatus according to a change of the touch coordinates corresponding to the received touch coordinates data, wherein the information processing apparatus further performs:

setting up a movement prohibition range that is a range prohibiting a movement of the second screen, determining whether the touch coordinates corresponding to the received touch coordinates data is included within the movement prohibition range, and not moving the second screen when it is determined that the touch coordinates corresponding to the received touch coordinates data is included within the movement prohibition range.

* * * * *